United States Patent
Glanville et al.

(10) Patent No.: US 8,919,334 B2
(45) Date of Patent: Dec. 30, 2014

(54) PORTABLE BARREL COOKER

(76) Inventors: Noah E. Glanville, Denver, CO (US); Amber D. Glanville, Denver, CO (US)

( * ) Notice: Subject to any disclaimer, the term of this patent is extended or adjusted under 35 U.S.C. 154(b) by 725 days.

(21) Appl. No.: 13/183,073

(22) Filed: Jul. 14, 2011

(65) Prior Publication Data

US 2013/0014743 A1 Jan. 17, 2013

(51) Int. Cl.
*F24B 1/24* (2006.01)
*A47J 37/07* (2006.01)

(52) U.S. Cl.
CPC .......... *A47J 37/0763* (2013.01); *A47J 37/0704* (2013.01)
USPC .......... 126/25 A; 126/25 R; 126/11; 126/1 R; 99/419; 99/448

(58) Field of Classification Search
CPC ....... A47J 37/00; A47J 37/07; A47J 37/0704; F24B 1/202; F24B 1/24; A23B 4/052; A23B 4/0523
USPC ..... 126/25 A, 25 R, 11, 1 R, 10; 99/419, 448, 99/482
See application file for complete search history.

(56) References Cited

U.S. PATENT DOCUMENTS

| | | | | |
|---|---|---|---|---|
| D97,580 | S | * | 11/1935 | Ingersoll ........................ D34/39 |
| 3,457,853 | A | * | 7/1969 | Morley ............................ 99/349 |
| 3,529,536 | A | * | 9/1970 | Milhem .......................... 99/346 |
| 3,851,639 | A |   | 12/1974 | Beddoe |
| 3,868,942 | A | * | 3/1975 | Lewis .......................... 126/25 R |
| 3,974,760 | A | * | 8/1976 | Ellis ................................. 99/482 |
| 4,512,249 | A |   | 4/1985 | Mentzel |
| 5,325,841 | A | * | 7/1994 | Hooper, Sr. .................. 126/25 R |
| 5,711,209 | A | * | 1/1998 | Guines ............................. 99/339 |
| 2006/0016447 | A1 |  | 1/2006 | Meyer |
| 2006/0075905 | A1 | * | 4/2006 | Shih ................................. 99/419 |
| 2006/0260599 | A1 |  | 11/2006 | Butt |
| 2009/0020491 | A1 |  | 1/2009 | Foster |
| 2009/0199839 | A1 |  | 8/2009 | Hulsey |
| 2010/0300425 | A1 |  | 12/2010 | Rees |
| 2011/0061543 | A1 |  | 3/2011 | Ingrassia et al. |

* cited by examiner

*Primary Examiner* — Avinash Savani
(74) *Attorney, Agent, or Firm* — The Reilly Intellectual PropertyLaw Firm, P.C.

(57) ABSTRACT

Several embodiments of an outdoor cooking apparatus are described having an upright barrel enclosure with an open end, a removable lid, a pre-measured heat source basket, an adjustable venting member and dual suspension frames or grate.

21 Claims, 10 Drawing Sheets

PORTABLE BARREL COOKER

BACKGROUND AND FIELD

The following relates to an outdoor cooking apparatus and more particularly relates to a barrel enclosure having a grill, pre-measured heat source basket and one or more suspension frames with hooks.

In the past, a number of different approaches have been taken to provide an effective means of grilling food over charcoal. It is desirable to provide for a cooking apparatus that allows food to be cooked over high heat without flare ups and to also allow smoking of the food without the extended period of time typically required.

SUMMARY

Conventional portable charcoal grills typically include an oval housing with a grill rack placed directly above hot coals. The food to be grilled is cooked over high heat and in proximate relation to the coals. Barbecuing over coals requires constant supervision due to flare ups and inconsistent heat while smoking foods requires at least 8 hours of cooking time and the consistency of the end result may be variable. The present cooking apparatus allows for grilling of food conveniently with a consistent and time efficient final product.

There is disclosed several forms of a cooking apparatus for outdoor use comprising an upright drum having a lower closed end, a basket removably positioned above the lower closed end of the drum containing a heating material, a vent in a lower portion of the drum in outer spaced relation to the basket, a removable lid mounted on the drum, and at least one suspension member traversing an upper end of the drum, including a food suspension member removably positioned on the rod for suspending food material to be cooked a predetermined distance above the basket. A second embodiment allows for replacement of the suspension member with a grate member for grilling of non-suspended foods. A third embodiment has a removable suspension member and a fourth embodiment includes circumferentially spaced foot members, a temperature gauge or a bottle opener.

There has been outlined the more important features in order that the detailed description thereof that follows may be better understood, and in order that the present contribution to the art may be better appreciated. There are, of course, additional features that will be described hereinafter and which will form the subject matter of the claims appended hereto. In this respect, it is to be understood that embodiments are not limited in their application to the details of construction and to the arrangements of the components set forth in the following description and is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes described herein. It is important, therefore, that the claims be regarded as including such equivalent constructions insofar as they do not depart from the spirit and scope thereof.

DETAILED DESCRIPTION OF THE DRAWINGS

DETAILED DESCRIPTION

Referring in more detail to the drawings, a first embodiment of a portable drum or barrel cooker 11 is shown in FIGS. 1-5, the cooker 11 comprising an upright cylindrical hollow member having a lower closed bottom portion 19, vertical sidewalls 13 terminating in an upper, open end 20 defining a barrel with one closed end. The housing could have a variety of shapes, such as rectangular, without departing from the scope of this disclosure. Preferably the cooker 11 is in the form of a 30 gallon oil drum but other sizes of a barrel such as a 55 gallon barrel, as well as other material, preferably heat-accommodating material such as metal, may be used without departing from the scope of this disclosure. The cooker 11 is uniformly constructed of sheet metal with a constant thickness throughout. The exterior 18 of the cooker 11 is coated with a heat-resistant paint such as RustOleum® paint but other brands of heat-tolerant paint may be used as well. Rim 24 of the open top appears as a thickened or reinforced lip. The cooker includes a lid member 21 with a corresponding ridged rim 22. The positioning of the reinforced lip 24 and the ridged rim 22 of the lid member 21 together form an open connection that does allow a small amount of air to escape and is not an airtight seal. The lid member 21 is also of metal construction and is designed to extend at least the full circumference of the opening 20 of the cooker 11. Handle member 28 is secured to the lid member 21 and facilitates opening of the lid to access the interior of the cooker 11. Optional side horseshoe handles 26 are soldered or secured to the exterior of the cooker 11 to facilitate the portability of the cooker 11. Other forms of handle members may be used without departing from the scope of the cooker.

A venting system 16 includes a circular venting cutout 23, a slidable vent cover 25, vent screw 27 and adjustment portal 28. The venting system 16 may be pre-adjusted to different altitude settings to control the amount of oxygen to pass through the cooker 11. This is accomplished by slightly rotating the venting cover 25 to change the circular opening of the cutout 23. The venting system 16 is located at the lower end of the vertical sidewalls 13 to allow oxygen to circulate along the lower portion of the cooker. This will be discussed in more detail at a later point. Optionally, the cooker has at least two spaced decorative ring members 15 and 17 encircling the cooker 11.

Figure 1:
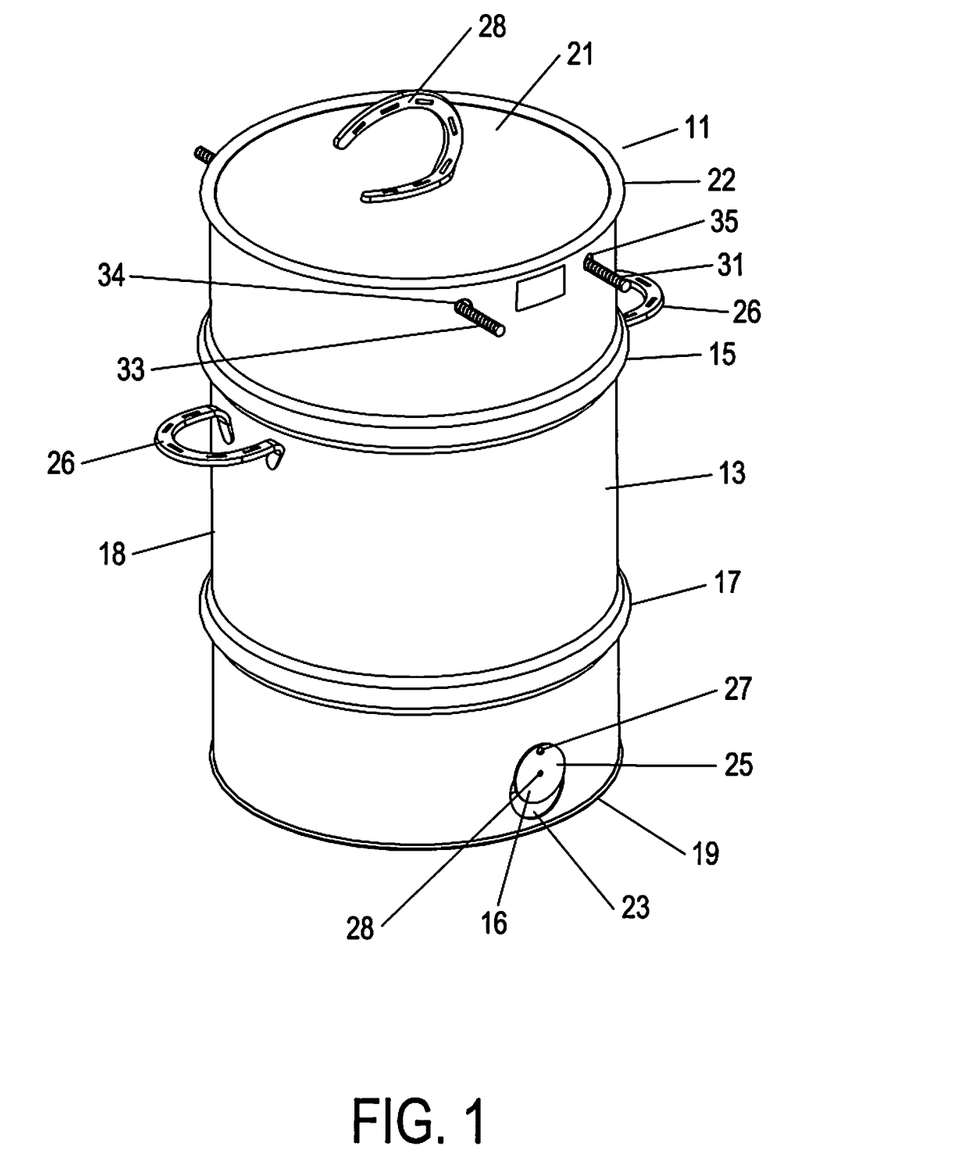
FIG. 1 is a front perspective view of a first embodiment of a drum cooker.
Figure 2:
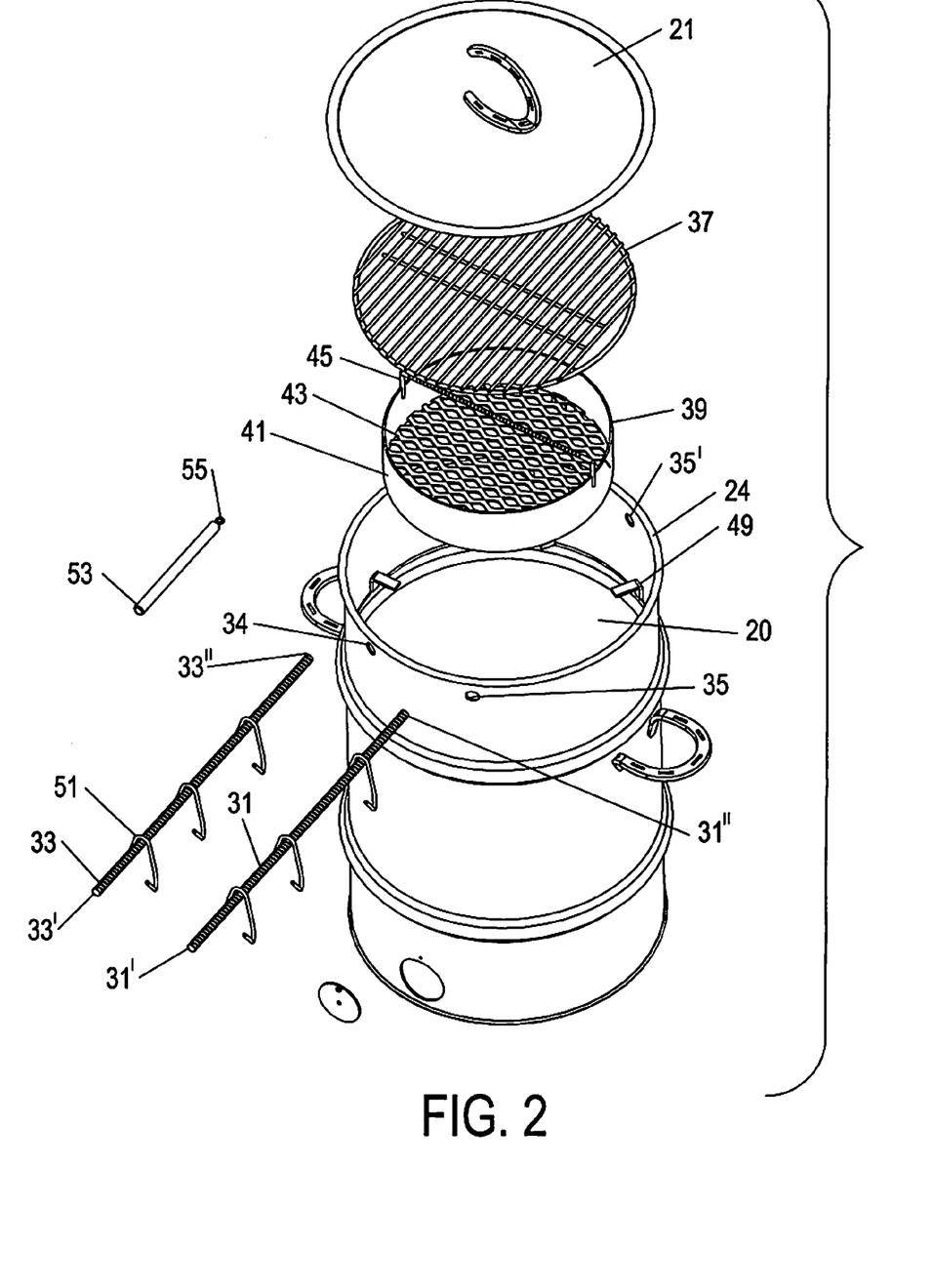
FIG. 2 is a front perspective exploded view of the embodiment shown in FIG. 1.
Figure 3:
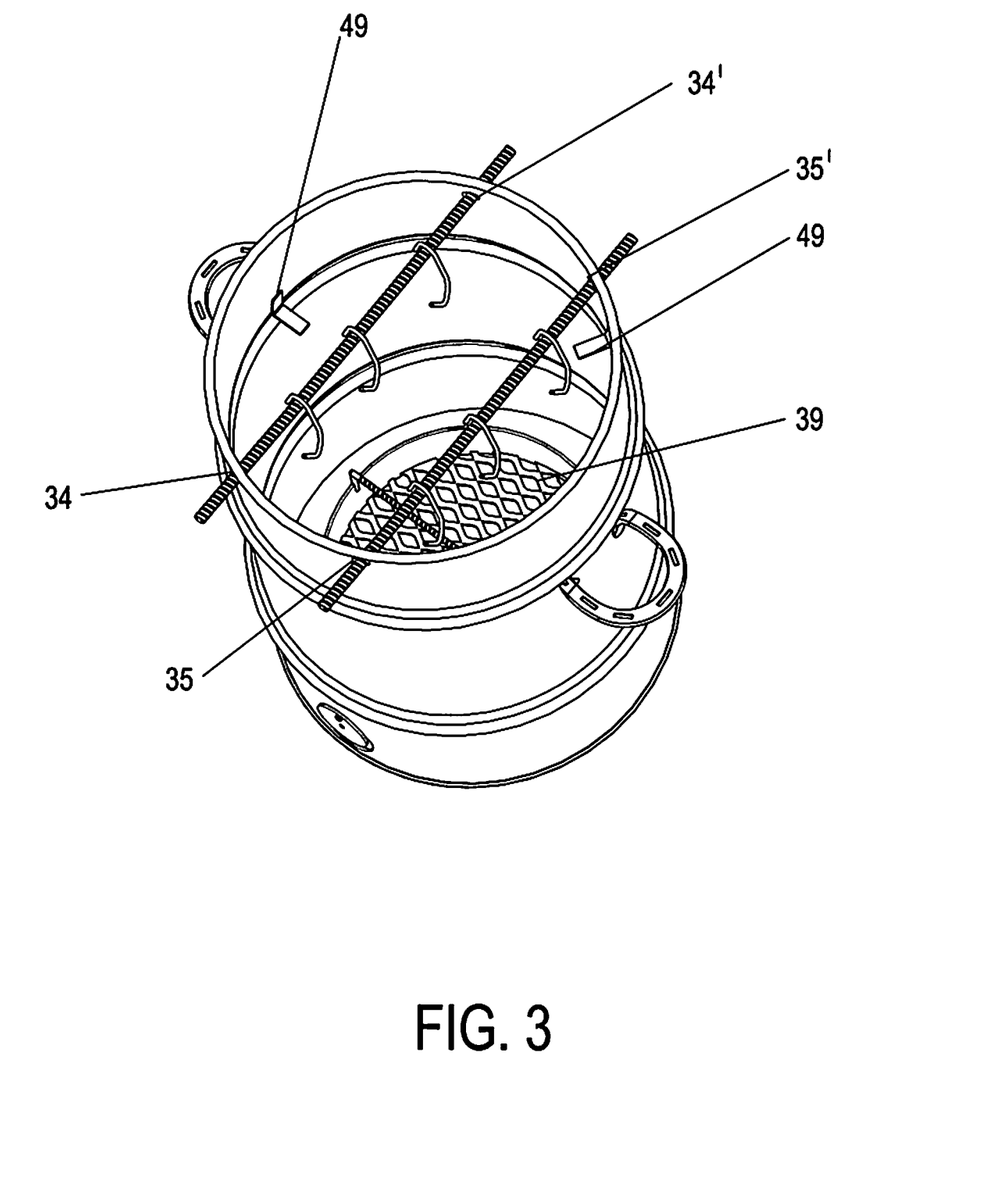
FIG. 3 is a top perspective view of the embodiment shown in FIG. 1.
Figure 4:
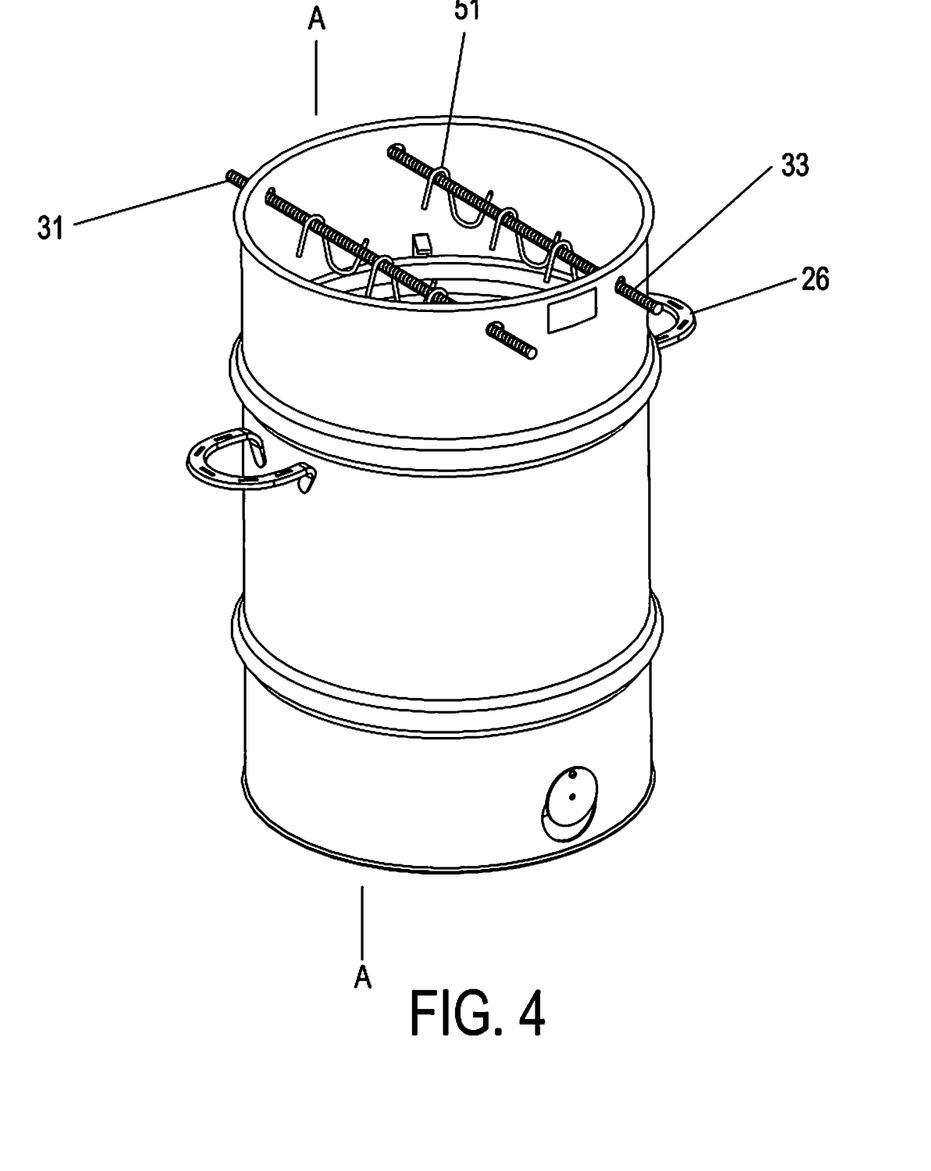
FIG. 4 is a another front perspective view of the embodiment shown in FIG. 1.

The interior of the cooker 11 consists of at least one, but preferably two or more suspension members 31 and 33 traversing an upper end of the cooker 11. The suspension members 31 and 33 are inserted through vent openings 34, 34' or 35, 35' that are present on opposite ends of the vertical walls 13 and are circumferentially spaced. If one suspension member is used, a terminal end 31' of the bar 31 may be inserted through the vent opening 34, extended transversely across the entire or a portion of the diameter of the cooker 11 and inserted through opposite vent opening 34'. If additional suspension members, such as suspension member 33, are used, the members may be aligned in parallel as shown in FIG. 3. The suspension members 31 and 33 may be made of rebar and act as a support for hook members 51. The hook members 51 are preferably stainless steel and are S-shaped, as shown in FIG. 4, but may also be C-shaped members 51' as shown in FIGS. 2 and 3 and may be removably positioned on the suspension members 31 and 33. The hook members 51 and 51' each have a sharpened end 52 and are designed to suspend at the opposite end from the suspension members 31 and 33. The sharpened end 52 is designed to pierce the food to be grilled G, such as at an upper end or middle portion of a chicken or beef, and allow for lengthwise downward suspension over the coals of the food to be grilled.

Figure 5:
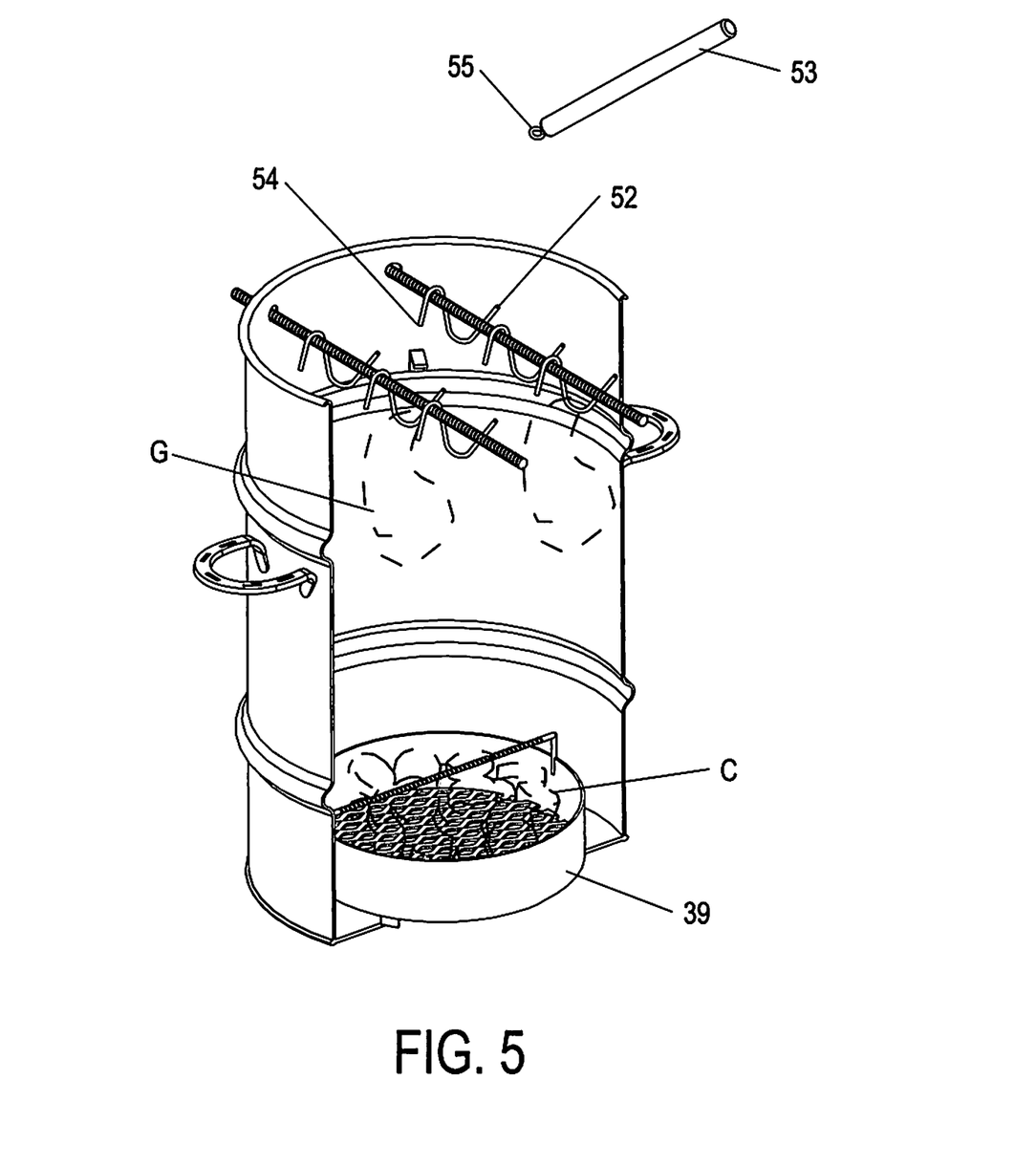
FIG. 5 is a cross-sectional view taken about Lines A-A of FIG. 4.
Figure 6:
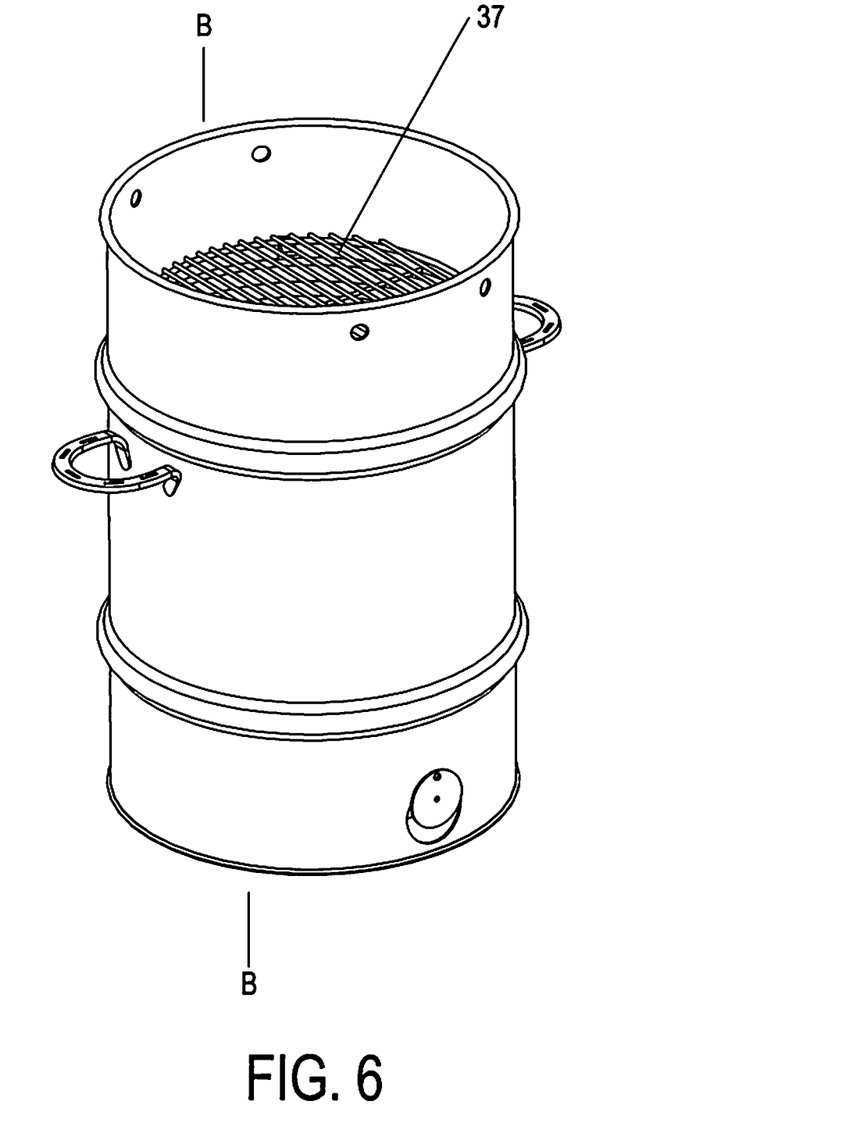
FIG. 6 is a front perspective view of a second embodiment of a drum cooker.
Figure 7:
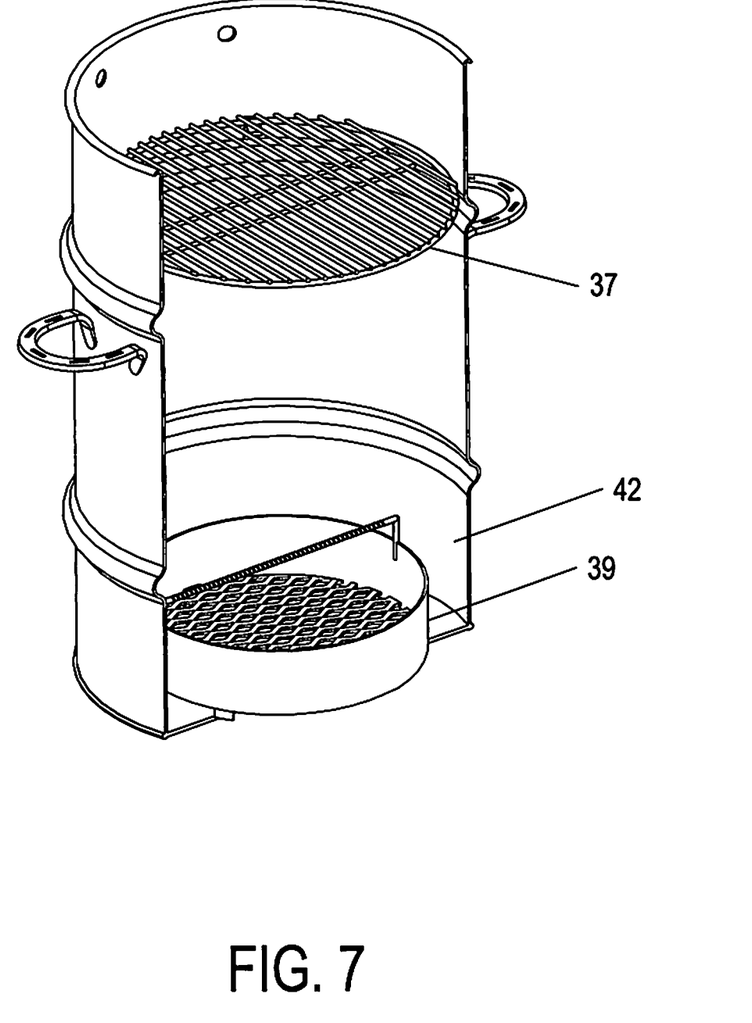
FIG. 7 is a cross-sectional view taken about Lines B-B of FIG. 6.

As shown in FIG. 2, the interior of the barrel includes at least three circumferentially spaced outer support brackets 49 designed to releasably support a grilling grid 37 in a level position. The support brackets 49 may be oriented in two different manners as shown in FIG. 2 and FIG. 3. The grilling grid may be a brand name grate, such as, the Webber Grille Grate model #7441 but is not limited to a pre-manufactured grill and may be manufactured to specifications. The grid 37 is provided to support food to be grilled G that the user does not want to suspend from the hook members 51 and is of a diameter to rest on the support brackets 49. Preferably, the grilling grid 37 is removed when the suspension members 31 and 33 are to be used and the suspension members are removed when the grilling grid 37 is to be used as shown in FIG. 5. The barrel also includes a pre-measured heat source basket 39 having a circular wall 41, a grid member 43, grid member supports (not shown), handle member 45 and at least three bottom support legs 47 for elevating the basket from the bottom 19 of the cooker 11. A pre-measured amount of charcoal or flammable material C is placed in the basket 39 on top of the grid member 43 as shown in FIG. 5. The grid member 43 is vented so that oxygen can pass through the charcoals in order to attain maximum heating. The height and width of the basket 39 have been pre-determined to hold a sufficient amount of charcoal or flammable material to adequately heat the cooker 11. The basket 39 has a diameter or width that is slightly smaller than the diameter or width of the cooker 11. The basket 39 can be adjustably positioned in the lower end 42 of the cooker 11, as shown in FIG. 7, and the charcoal or flammable material is ignited, typically with lighter fluid or any other type of fuel source. Once the heat source has attained maximum heating capability, the food G is then suspended using the suspension member(s) 31, 33 and hook members 51, as shown in FIG. 5.

The placement of the venting system 16 at the lower end of the cooker 11 and in outer spaced relation to the basket 39, allows oxygen to pass under the basket 39 and continue to supply oxygen to the heat source creating consistent, elevated heat. The positioning of the basket 39 at the lower end of the upright cooker 11 at a pre-determined distance from the suspension members 31, 33 or grilling grid 37 allows for heat to cook the food G without the high heat concerns that one typically has with a standard charcoal grill. Optimally, there is at least 12 inches of distance between the heat source and the food G. This allows for an even heat transfer without burning the food and also imparts a smoky flavoring to the food due to the slightly longer cooking time that is required. Further, the suspension of the food G allows for an even heat transfer without having to rotate the food to ensure a consistent and thoroughly cooked product. Once the grilling is complete, the hook members 51 may be removed from the suspension members 31 or 33 with a removal rod 53 having a hook 55 at one end for placement of an end 54 of the hook member 51 therethrough and removal of the grilled item from the cooker 11.

Figure 8:
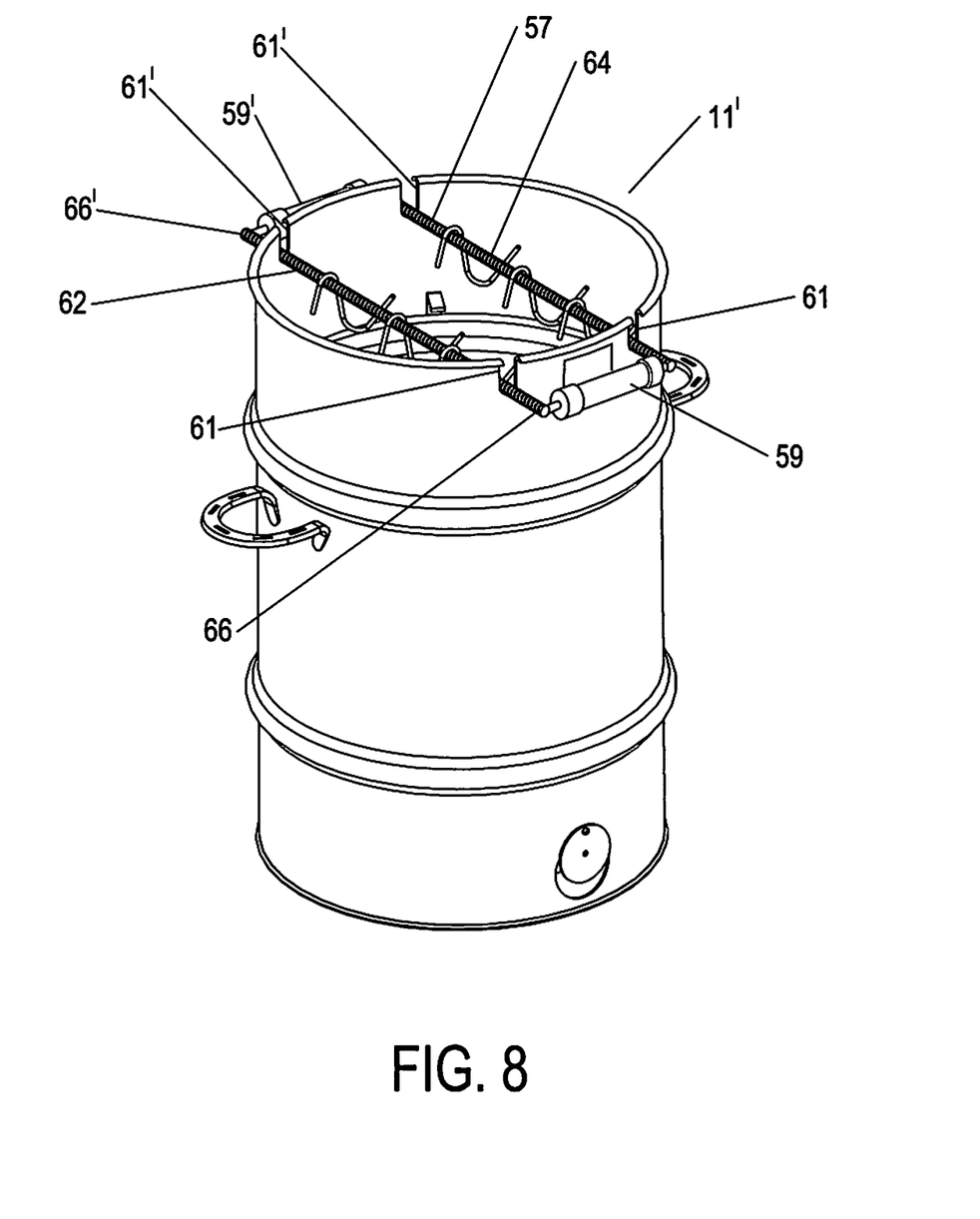
FIG. 8 is a front perspective view of a third embodiment of a drum cooker.
Figure 9:
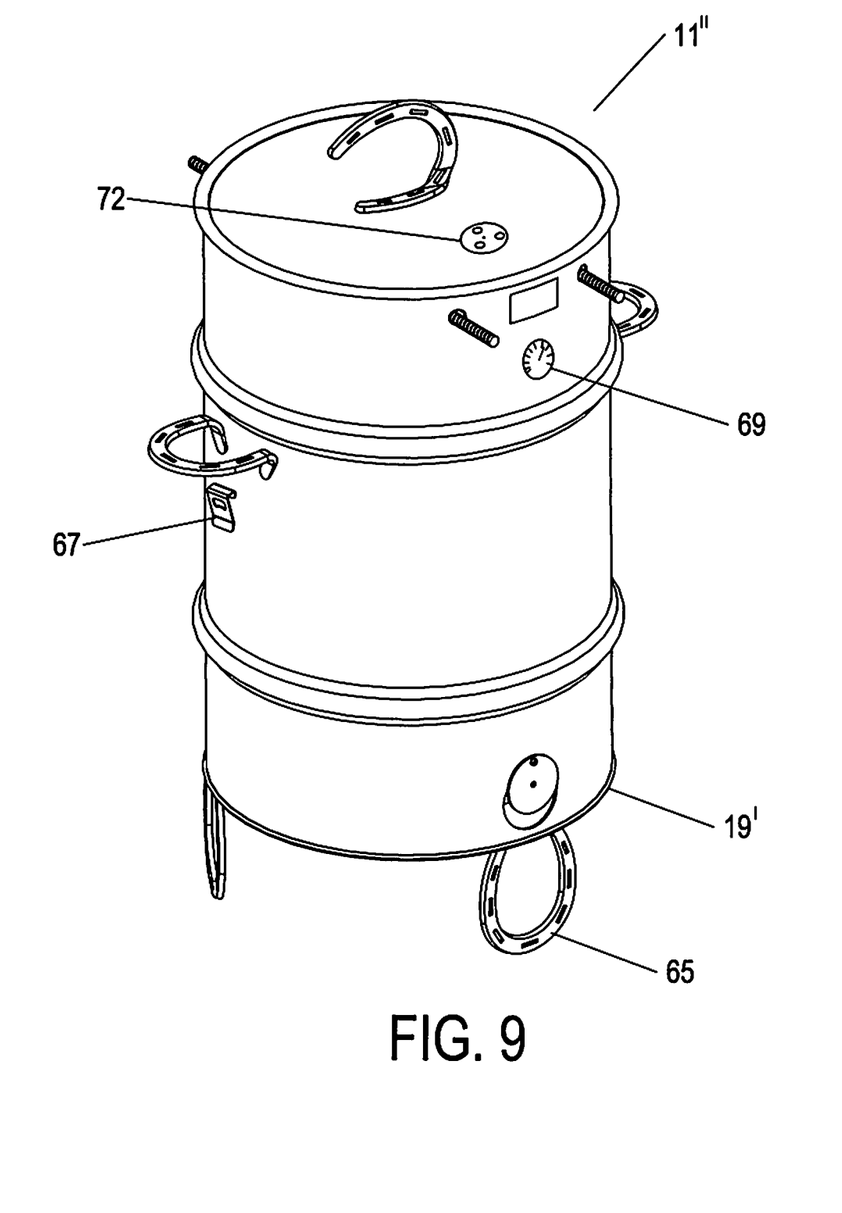
FIG. 9 is a front perspective view of a fourth embodiment of a drum cooker.
Figure 10:
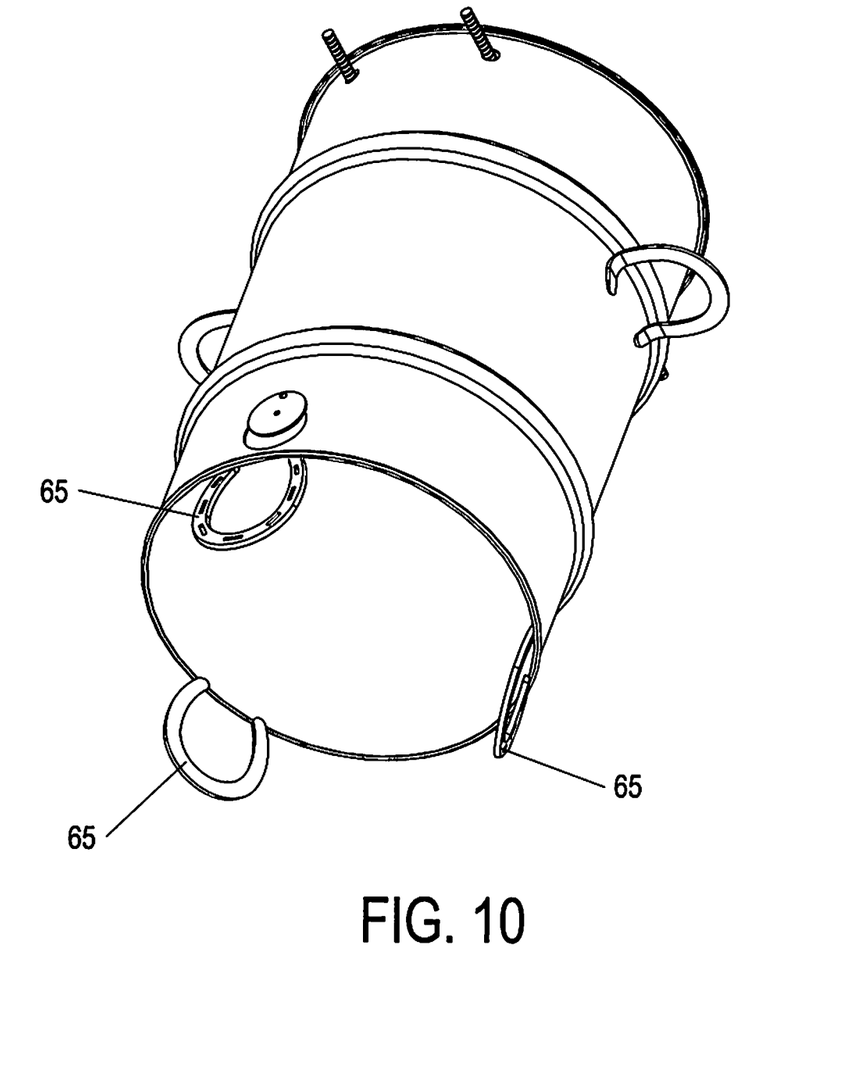
FIG. 10 is an end view of fourth embodiment shown in FIG. 9.

Alternate forms of cooker are shown in FIGS. 8-10. FIG. 8 shows a cooker 11' with a removable suspension member 57, preferably having at least two suspension rods 62 and 64 with dual handle members 59, 59' secured at opposite terminal ends 66, 66' of the suspension rods. The cooker 11' also includes opposite drop-in slots 61, 61' to allow for placement of the removable suspension member 57 within the cooker 11'. FIGS. 9 and 10 show optional horseshoe stands 65 that may be circumferentially spaced on the bottom portion 19' of the cooker 11". There is also an optional beer opener 67 and a temperature gauge 69. Finally, FIG. 9 shows an optional vent member 72 that has a rotatable butterfly opening that allows for adjustable venting on the lid member.

It is therefore to be understood that while different embodiments are illustrated and described, the above and other modifications may be made in the construction and arrangement of elements without departing from the spirit and scope of the invention as defined by the appended claims.

We claim:

1. A cooking apparatus for outdoor use, comprising:
   an upright metal drum of cylindrical configuration and of uniform diameter having a lower closed end;
   a cylindrical basket removably positioned above said lower closed end of said drum containing a heating material;
   a vent in a lower portion of said drum in outer spaced relation to said basket;
   a removable lid mounted on said drum;
   at least one removable suspension rod traversing an upper end of said drum, including a food suspension member removably positioned on said rod for suspending food material to be cooked a predetermined distance above said basket to regulate the rate of cooking of the food material; and
   suspension rod supports located on an upper portion of said upright metal drum.

2. The cooking apparatus according to claim 1 wherein said upright drum has an upper open end with a reinforced lip.

3. The cooking apparatus according to claim 2 wherein said reinforced lip corresponds to a ridged section on said removable lid.

4. The cooking apparatus according to claim 1 wherein said basket has a lower venting member and solid sidewalls.

5. The cooking apparatus according to claim 1 wherein said suspension rod is positioned at least 12 inches above said basket.

6. The cooking apparatus according to claim 1 wherein said removable lid includes an adjustable vent.

7. The cooking apparatus according to claim 1 wherein said lower portion vent includes a circular venting cutout, a slidable vent cover, a vent screw and an adjustment portal.

8. A cooking apparatus for outdoor use, comprising:
   a vertically positioned hollow metal drum having a closed bottom portion and an upright cylindrical wall of uniform diameter terminating in an open upper end;
   a venting member having a circular aperture at a lower end of said wall and a rotatable cover removably positioned over said aperture;
   a removable top member having a circumference slightly larger than that of said open upper end;
   suspension rod supports located on an upper portion of said upright metal drum;

at least one removable, horizontal suspension rod traversing at least a portion of the diameter of the drum adjacent to said upper end of said wall; and a pre-measured heat container.

9. The cooking apparatus according to claim 8 wherein said drum member is made up of sheet metal.

10. The cooking apparatus according to claim 8 wherein said top member has a circumferential ridged portion that abuts the rim of said open upper end.

11. The cooking apparatus according to claim 8 wherein said at least one suspension rod is inserted through said suspension rod supports.

12. The cooking apparatus according claim 11 wherein a secondary suspension rod is inserted in parallel to said at least one suspension rod.

13. The cooking apparatus according to claim 8 wherein said at least one horizontal suspension rod includes at least one suspension hook.

14. The cooking apparatus according to claim 8 wherein said pre-measured heat container is situated along an interior lower portion of said drum and in close proximity to said venting member.

15. The cooking apparatus according to claim 8 wherein said pre-measured heat container includes a basket pre-measured for charcoal, a handle member, a lower venting grate and solid sidewalls.

16. The cooking apparatus according to claim 8 wherein said drum includes a temperature gauge.

17. A portable charcoal grill housing comprising:

a removable lid, a food support member and a charcoal basket;

said grill housing defined by an upright metal drum having a lower closed end and an open upper end;

said basket removably positioned above said lower closed end of said drum and containing a heating material;

a vent in a lower portion of said drum in outer spaced relation to said basket and having a rotatable and adjustable closure member secured with a pin member;

suspension rod support means located on an upper portion of said upright metal drum;

said removable lid having an adjustable venting member; and said food support member comprising either a grill rack or a suspension rod, traversing at least a portion of said drum and removably positioned a predetermined distance above said basket to regulate the rate of cooking of food material.

18. The portable grill housing according to claim 17 wherein said basket is adapted to fit within said housing and including spaced support legs.

19. The portable grill housing according to claim 17 wherein said housing includes at least one circumferentially spaced handle member along an exterior portion of said housing.

20. The portable grill housing according to claim 17 wherein said removable lid includes a handle member.

21. The portable grill housing according to claim 17 wherein an exterior surface of said housing includes a bottle opener.

* * * * *